United States Patent
Engel et al.

(10) Patent No.: US 8,851,262 B2
(45) Date of Patent: Oct. 7, 2014

(54) COUPLING DEVICE ACTUATED BY CENTRIFUGAL FORCE

(75) Inventors: Bernd Engel, Stuttgart (DE); Lukas Zürcher, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 383 days.

(21) Appl. No.: 13/021,792

(22) Filed: Feb. 7, 2011

(65) Prior Publication Data

US 2011/0198182 A1 Aug. 18, 2011

(30) Foreign Application Priority Data

Feb. 17, 2010 (DE) .......................... 10 2010 008 244

(51) Int. Cl.
*F16D 23/10* (2006.01)
*F16D 43/18* (2006.01)

(52) U.S. Cl.
CPC ..................................... *F16D 43/18* (2013.01)
USPC ................................................... 192/105 BA

(58) Field of Classification Search
USPC ......... 192/105 BA, 76, 89.1, 105 A, 105 BB, 192/103 B
See application file for complete search history.

(56) References Cited

U.S. PATENT DOCUMENTS

| | | | |
|---|---|---|---|
| 2,097,627 A * | 11/1937 | Lewis .......................... | 192/214.1 |
| 2,115,819 A * | 5/1938 | Lewis ............................. | 192/212 |
| 2,514,228 A | 7/1950 | Dodge | |
| 2,814,373 A * | 11/1957 | Bixby ...................... | 192/53.331 |
| 2,868,343 A * | 1/1959 | Sproul .................... | 192/105 BA |
| 3,991,864 A * | 11/1976 | Muller .................... | 192/105 BA |
| 4,892,175 A | 1/1990 | Van Erden | |
| 5,387,052 A * | 2/1995 | Artzberger ................. | 404/133.1 |
| 5,560,465 A | 10/1996 | Zindler | |
| 5,680,920 A * | 10/1997 | Jansson et al. ......... | 192/105 BA |
| 6,857,515 B2 * | 2/2005 | Barron et al. .......... | 192/105 BA |
| 2002/0148701 A1* | 10/2002 | Nickel .................... | 192/105 BA |
| 2005/0121285 A1* | 6/2005 | Edwards et al. ....... | 192/105 BA |
| 2007/0251743 A1 | 11/2007 | Adams | |

FOREIGN PATENT DOCUMENTS

| | | |
|---|---|---|
| DE | 31 25 444 A1 | 1/1983 |
| DE | 89 03 848 U1 | 6/1989 |
| DE | 9411945 U1 | 11/1995 |
| JP | 1-119932 | 8/1989 |
| WO | 2007/010688 A1 | 1/2007 |

* cited by examiner

*Primary Examiner* — Rodney H Bonck
*Assistant Examiner* — Stacey Fluhart
(74) *Attorney, Agent, or Firm* — Gudrun E. Huckett

(57) ABSTRACT

A coupling device actuated by centrifugal force has a holder and at least one flyweight supported on the holder so as to be moveable in a radial direction relative to an axis of rotation about which the coupling device is rotatable. The flyweight is movable between an inner radial position and an outer radial position. At least one spring acting on the flyweight is provided that forces the flyweight into the inner radial position. At least one securing element secures at least one component of the coupling device in an axial direction of the axis of rotation. The securing element is monolithically formed on the flyweight.

16 Claims, 4 Drawing Sheets

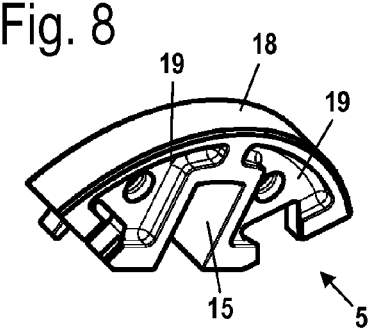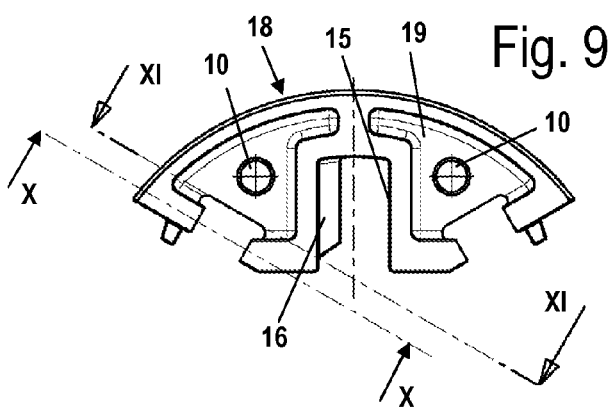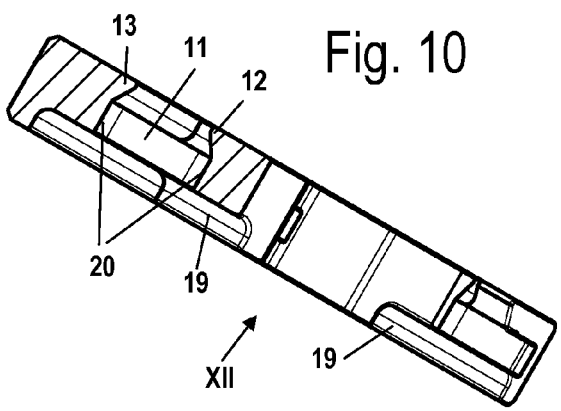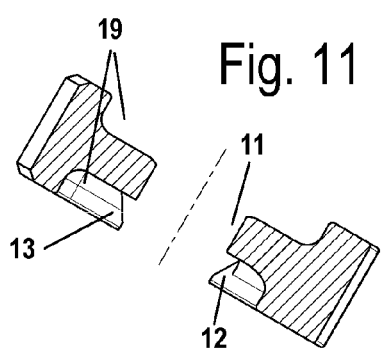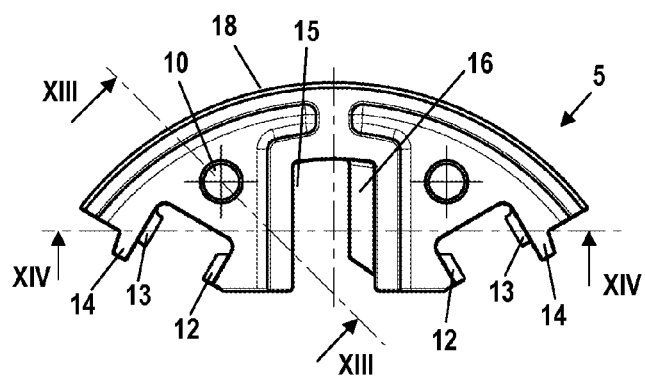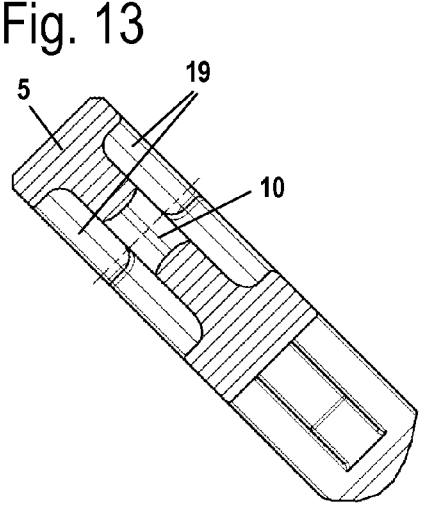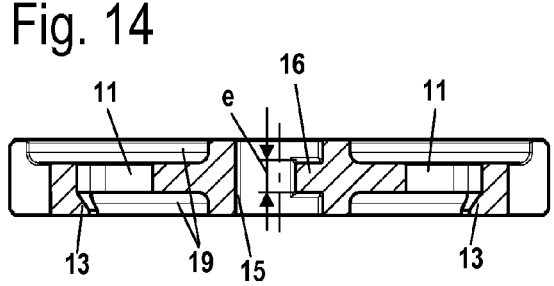

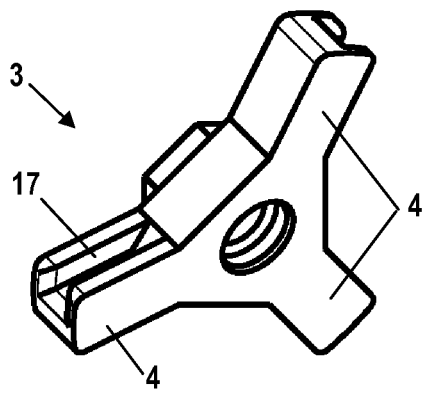
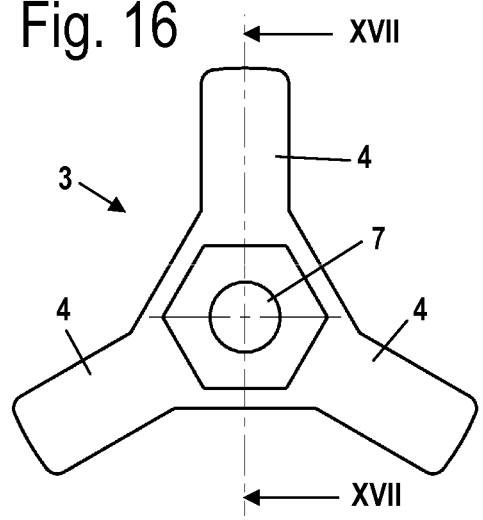
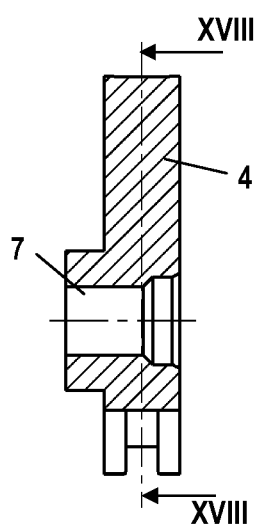
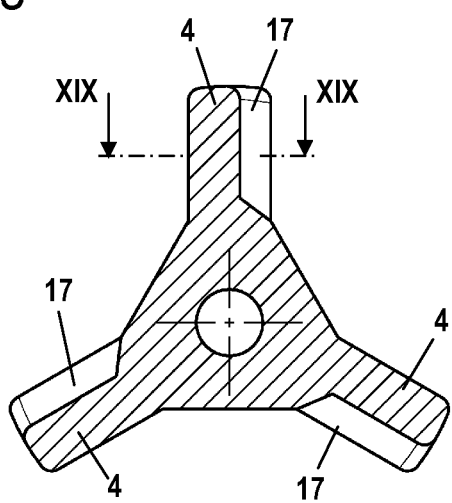
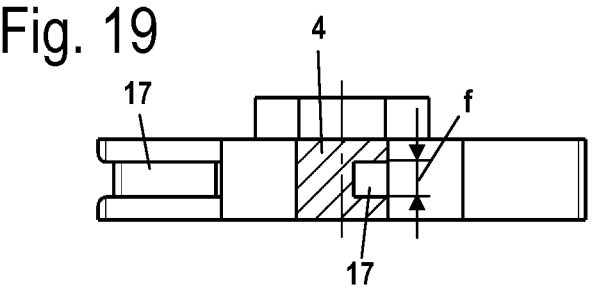

COUPLING DEVICE ACTUATED BY CENTRIFUGAL FORCE

BACKGROUND OF THE INVENTION

The invention relates to a coupling device that is actuated by centrifugal force and comprises at least one centrifugal weight (flyweight) that is supported on a holder so as to be moveable in radial direction, wherein the centrifugal weight is movable between an inner radial position and an outer radial position. It comprises at least one spring that loads the centrifugal weight in the direction toward the inner radial position. The coupling device is arranged to be rotatable about an axis of rotation and comprises at least one securing element that secures at least one component of the coupling device in the direction of the axis of rotation.

DE 94 11 945 U1 discloses a coupling device that is actuated by centrifugal force, i.e., a centrifugal clutch, in which a holder is provided for securing the axial position of the flyweights (centrifugal weights). The holder also covers partially the springs in axial direction.

When a spring breaks, it must be prevented that the spring pivots out of the area of the centrifugal clutch and comes into contact with neighboring parts and thereby damages or destroys them. In this connection, it is known to cover by means of a disk the entire clutch at the side that is opposite the clutch drum.

When using a centrifugal clutch in hand-held power tools such as motor chainsaws, trimmers or the like, it is desirable that, on the one hand, the weight of the centrifugal clutch is as small as possible and, on the other hand, the size in axial direction is as minimal as possible.

SUMMARY OF THE INVENTION

It is an object of the present invention to provide a coupling device, actuated by centrifugal force, of the aforementioned kind such that it has a simple configuration and a minimal weight.

In accordance with the present invention, this is achieved in that at least one securing element is monolithically formed or integrally formed with the flyweights.

Since the securing element is a monolithic part of the flyweight, it can be of a small size. In comparison to coupling devices provided with a separate disk for an axial securing action, the size is reduced with respect to the width and the weight of the securing disk is eliminated. The configuration of the coupling device is simplified because no additional components are required for the securing element. Wrong assembly of the securing element—which is possible in case of separate configuration of the securing element—is prevented. Mounting is simplified because fewer components must be assembled.

Advantageously, the securing element secures at least one spring in the axial direction of the axis of rotation. The securing element serves in particular for securing the spring, when it is damaged or broken, on the centrifugal clutch and to prevent lateral deflection of the spring or escape of spring fragments. The spring is advantageously arranged with a portion of its length in a receptacle in the flyweight. Advantageously, the receptacle at its radially inwardly positioned side and at its radially outwardly positioned side has a securing element for the spring. The spacing between the securing elements is in this connection advantageously smaller than the outer diameter of the spring. In this way, it is prevented in a simple fashion that the spring can be laterally deflected when the spring breaks. The securing elements are advantageously arranged on a side of the flyweight that is opposite the clutch drum. This is so because deflection of the spring to the side facing the clutch drum is prevented by the clutch drum itself.

A simple configuration results when the securing element is embodied as a securing nose arranged in a position neighboring the circumference of the spring and configured in a wedge shape. The securing nose may be of a very small size. It only narrows or constricts the receptacle such that the spring, or fragments of the spring, cannot fall out. The size in axial direction is not enlarged by the securing element so that in comparison to known arrangements it is possible to save mounting space.

Advantageously, at least two flyweights are provided wherein the spring is configured as a coil tension spring and with its ends is suspended from neighboring flyweights. Between the flyweights there is advantageously an intermediate space that is bridged by the spring. Advantageously, at least one radial securing element is provided that is formed monolithically or integrally with a flyweight and that projects at the radially outwardly positioned side of the spring adjacent to the spring into the intermediate space. In this way, a broken-off spring section is prevented in a simple way from falling out in outward radial direction. Advantageously, two radial securing elements extend away from neighboring flyweights toward one another. The spacing between the securing elements is in particular such that in the rest position of the coupling device the spacing is approximately 0.5 times up to 2 times the wire diameter of the spring. In this way, it can be prevented that neighboring flyweights, even for unfavorable manufacturing tolerances, will contact each other. At the same time, it can be prevented that fragments of the spring can escape in radial direction outwardly. Since the securing elements can be embodied to be comparatively small, only a minimal increase of the total weight results. Compared to known securing arrangements the total weight of the coupling arrangement is reduced.

In order to achieve overall reduced dimensions of the coupling device it is provided that the outer diameter of the spring corresponds at least to the thickness of the flyweight. The flyweights are therefore to be designed so narrow or slim that they do not project laterally past the spring. The width of the coupling device is determined by the diameter of the required spring.

Advantageously, a securing element secures the position of the flyweight on the holder in the direction of the axis of rotation. In known coupling devices separate holders are provided for this purpose. The holders represent additional components that make the configuration of the coupling device more complex and increase the weight of the coupling device. A simple configuration results when the securing element is provided on the flyweight as a guide stay that projects into a guide groove provided on the holder. In this way, the flyweight can be secured axially in both directions relative to the holder. In particular, the guide groove is formed on the guide socket of the holder and the guide stay is configured monolithically with the flyweight and projects into the guide slot of the flyweight.

Advantageously, the flyweight is comprised of metal. In particular, at least one securing element is monolithically sintered onto the flyweight. In this way, the securing element and the flyweight can be produced in a common manufacturing process. Separate manufacturing steps for producing the securing element are not necessary. An advantageous configuration results when three flyweights are provided that are connected to each another by means of three springs.

The coupling device is in particular a centrifugal clutch that has a clutch drum on which the flyweights rest in their outer radial position. The coupling device can however also be a braking device or the like that is actuated by centrifugal force.

BRIEF DESCRIPTION OF THE DRAWING

FIG. 8 is a perspective illustration of a flyweight.

FIG. 9 is side view of the flyweight of FIG. 8.

FIG. 10 is a section view along the section line X-X of FIG. 9.

FIG. 11 is a section view along the section line XI-XI of FIG. 9.

FIG. 12 is a side view in the direction of arrow XII of FIG. 10.

FIG. 13 is a section view along the section line XIII-XIII of FIG. 12.

FIG. 14 is a section view along the section line XIV-XIV of FIG. 12.

FIG. 15 is a perspective illustration of a holder of the centrifugal clutch.

FIG. 16 is a side view of the holder.

FIG. 17 is a section view along the section line XVII-XVII of FIG. 16.

FIG. 18 is a section view along the section line XVIII-XVIII of FIG. 17.

FIG. 19 is a section view along the section line XIX-XIX of FIG. 18.

DESCRIPTION OF THE PREFERRED EMBODIMENTS

Figure 1:
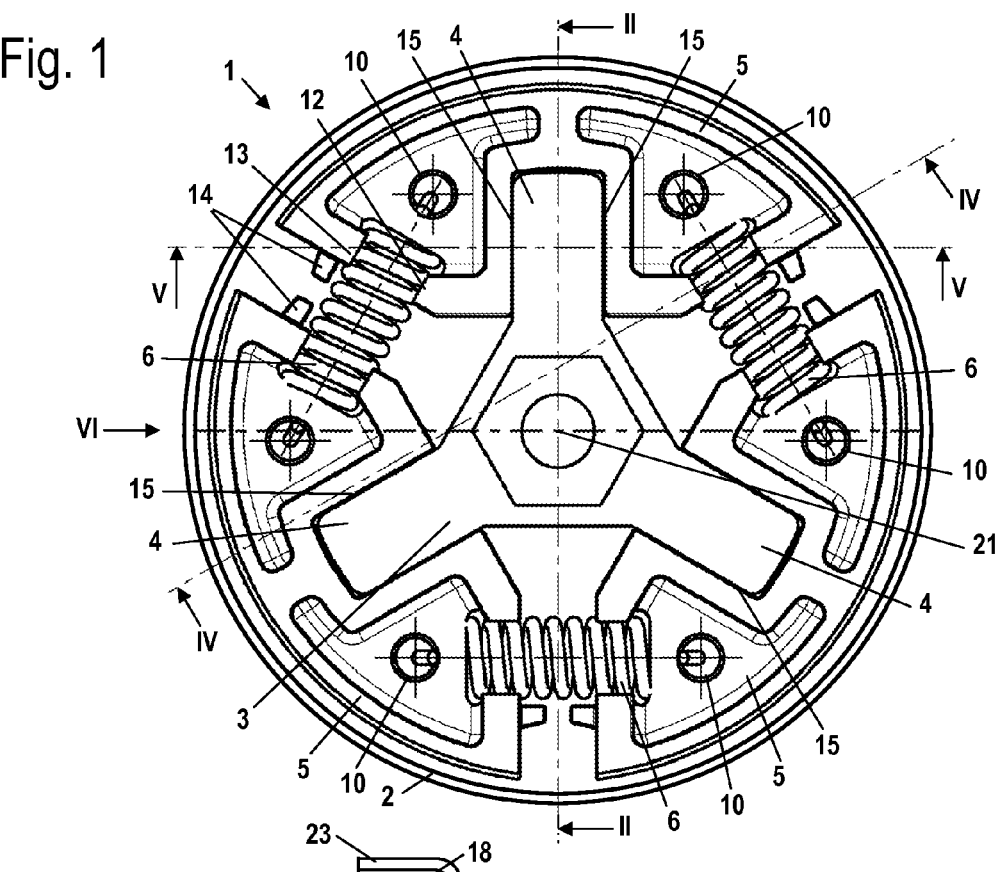
FIG. 1 is a side view of a centrifugal clutch.
Figure 2:
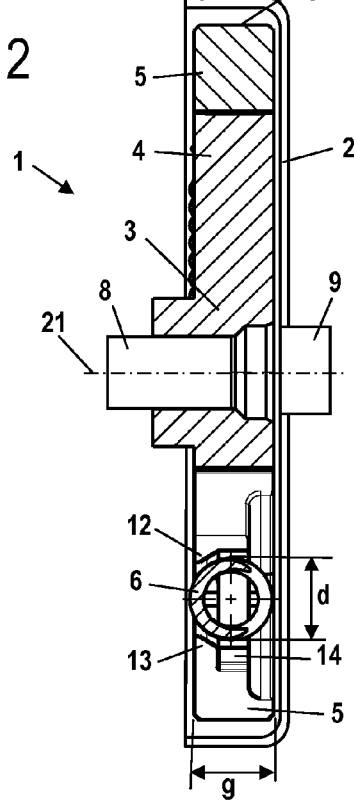
FIG. 2 is a section view along the section line II-II of FIG. 1.
Figure 3:
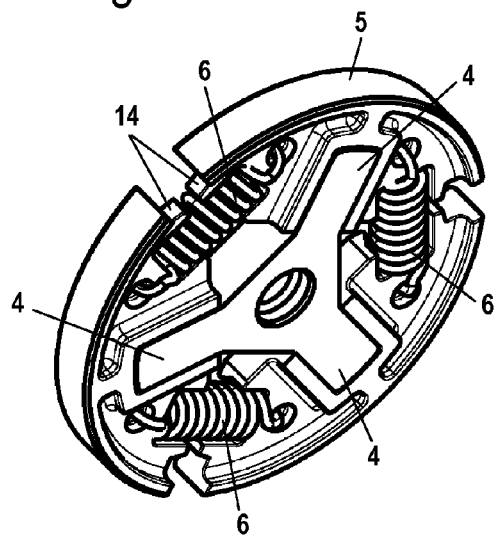
FIG. 3 is a perspective illustration of the centrifugal clutch without clutch drum.

FIG. 1 shows an embodiment of a coupling device that is actuated by centrifugal force in the form of a centrifugal clutch 1. Instead of the centrifugal clutch 1, a braking device or the like that is actuated by centrifugal force can be provided also. The centrifugal clutch 1 is advantageously arranged in the drive train of a hand-held power tool, such as a motor chainsaw, a trimmer, a cut-off machine or the like, between the drive motor and the tool to be driven and connects the tool fixedly to the drive shaft of the motor when a constructively predetermined coupling speed is surpassed. At idle speed of the drive motor that is in particular embodied as an internal combustion engine, the engine is usually separated from the tool. The centrifugal clutch 1 has a holder 3 that, as schematically illustrated in FIG. 2, is fixedly connected to the drive shaft 8. The holder 3 has three guide sockets 4 that project outwardly in radial direction; each one has a flyweight 5 arranged thereon. The three identically embodied flyweights 5 each have two suspension openings 10 for springs 6. Each spring 6 is suspended with its ends in flyweights 5 that neighbor each other in the circumferential direction.

The centrifugal clutch 1 has a clutch drum 2 whose rim 23 encloses the flyweights 5 at their outward area in the radial direction. In the rest position illustrated in FIGS. 1 and 2, the springs 6 pull the flyweights 5 into their inner radial position. When the drive shaft 8 rotates about axis of rotation 21 that is simultaneously the symmetry axis of the centrifugal clutch 1, then the centrifugal force acts on the flyweights 5 in radial direction outwardly against the force of the springs 6. The flyweights 5, when a constructively predetermined speed is surpassed, will be deflected in radial direction outwardly and with their friction surface 18 will contact the rim 23. In this way, the drive shaft 8 will be in frictional engagement with the clutch drum 2. On the clutch drum 2 an output shaft 9 is fixedly secured (indicated schematically in FIG. 2).

When one of the springs 6 breaks in operation of the clutch 1, it must be prevented that the spring 6 will move to the left (in the illustration of FIG. 2) past the centrifugal clutch 1 and in this way cause damage or destruction of neighboring components. In order to secure the spring 6 safely inside the clutch 1 when the spring 6 breaks, securing noses 12 and 13 are integrity or monolithically formed on the flyweights 5 adjacent to the spring 6. In this connection, the securing noses 12 are positioned in radial direction inwardly and the securing noses 13 in radial direction are positioned outwardly relative to the axis of rotation 21. In order to prevent that the spring 6 can escape in radial direction, radial securing noses 14 are formed integrally or monolithically on the flyweights 5. The design of the securing noses 12, 13, 14 is explained in more detail in the following.

FIG. 2 shows that the centrifugal clutch 1 is comparatively narrow or slim. The thickness g of the flyweights 5 that is measured parallel to the axis of rotation 21 is in the illustrated embodiment somewhat smaller than the outer diameter d of the spring 6. For an identical constructive width of the centrifugal clutch 1 it is therefore not possible to arrange the spring 6 in a receptacle that is closed on the side that is facing away from the clutch drum 2.

Figure 4:
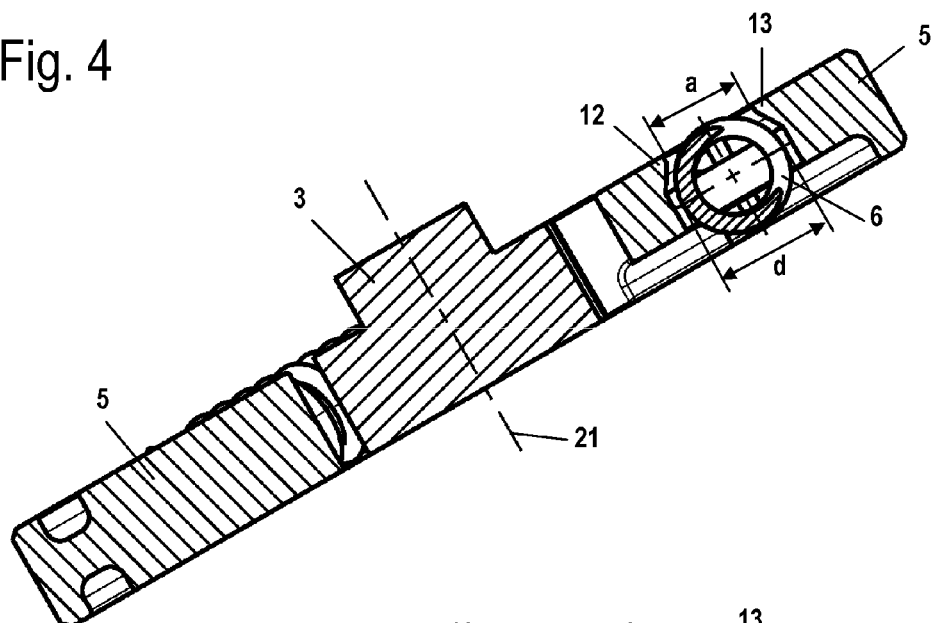
FIG. 4 is a section view along the section line IV-IV of FIG. 1 without the clutch drum.
Figure 5:
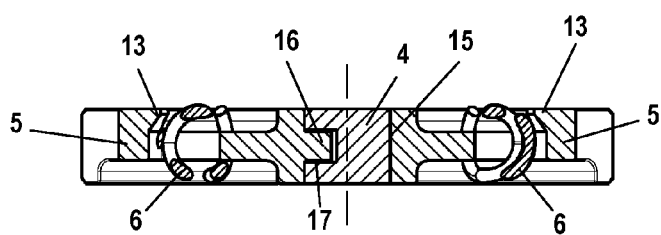
FIG. 5 is a section along the section line V-V of FIG. 1 without the clutch drum.
Figure 6:
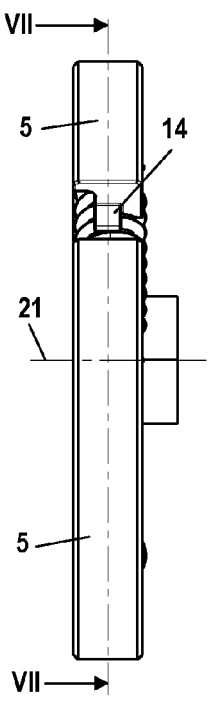
FIG. 6 is a side view of the centrifugal clutch without clutch drum in the direction of arrow VI of FIG. 1.

FIGS. 3 to 7 show the configuration of the centrifugal clutch 1 in detail. As shown in FIG. 4, the securing noses 12 and 13 are approximately wedge-shaped. The securing noses 12 and 13 have relative to each other a spacing a (see FIG. 4) that is smaller than the outer diameter d of the spring 6. As shown in FIG. 6, the radial securing noses 14 are formed in the central area of the flyweights 5 as stays that extend about less than half the thickness g (FIG. 2) of the flyweights 5. This is sufficient for retaining the springs 6.

Figure 7:
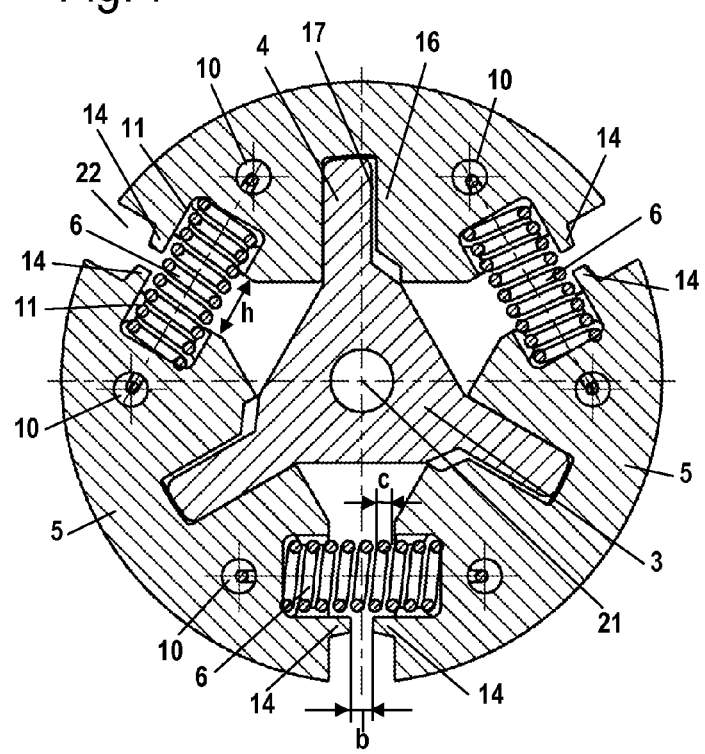
FIG. 7 is a section view along the section line VII-VII of FIG. 6.

As shown in FIG. 7, the flyweights 5 each have two receptacles 11 in which an end section of the springs 6 can be arranged. The receptacles 11 are oriented approximately tangentially to the axis of rotation 21 so that the springs 6 are also arranged tangentially to the circumferential direction relative to the axis of rotation 21. The receptacles 11 of neighboring flyweights 5 are positioned so as to face each other so that each spring 6 is arranged with a first end in a first flyweight 5 and with a second end in a second, neighboring flyweight 5. Between neighboring flyweights 5 an intermediate space 22 is formed, respectively, that has a width h. The radial securing noses 14 project into this intermediate space 22. The intermediate space 22 is bridged by springs 6. As shown in FIG. 7, the securing noses 14 in the rest position have a spacing b relative to one another that in the illustrated embodiment is slightly greater than the wire diameter c of the spring 6 that is embodied as a coil tension spring. The spacing b is advantageously approximately one half up to twice that of the wire diameter c.

The centrifugal clutch 1 has also a securing element that secures the position of the flyweights 5 on the holder 4 in the axial direction of the axis of rotation 21. As shown in FIGS. 1 and 5, the guide sockets 4 of the holder 3 project into guide slots 15 of the flyweights 5. The guide slots 15 are oriented radially relative to the axis of rotation 21. However, the guide slots 15 can also be slanted or curved relative to the radial direction of the axis of rotation 21. Into the guide slots 15 a guide stay 16 projects, respectively, and extends in the longitudinal direction of the guide slots 15 and projects centrally into the guide slots 15 (FIG. 5). The guide stay 16 is significantly narrower than the flyweights 5. The guide stay 16 is engaged by the guide sockets 4 of the holder 3 on its top side and its bottom side. For receiving the guide stay 16 the guide socket 4 has a guide groove 17 into which the guide stay 16 projects (FIG. 5). In this way, the position of the flyweights 5 relative to the holder 4 is secured in the axial direction of the as of rotation 21.

FIGS. 8 to 14 show the configuration of the flyweights 5 in detail. FIG. 10 shows that the receptacle 11 for the spring 6 has sidewalls 20 that are extending approximately parallel to the axis of rotation 21. The wedge-shaped securing noses 12 and 13 extend from the sidewalls 20 into the receptacle 11. As shown in the Figures, the flyweights 5 have on both sides recesses 19 that each extend about approximately one third of the thickness of the flyweight 5. Only in the area of the guide slot 15 the flyweight 5 extends about the entire width or thickness. The recesses 19 are provided in the area of the receptacle 11 and the suspension openings 10 so that in this area a minimal thickness of the flyweights 5 and thus a reduced total weight of the centrifugal clutch 1 result. As shown in FIG. 12, the guide stay 16 extends approximately about the entire depth of the guide slot 15. In the illustrated embodiment, only on one side of the guide slot 15 a guide stay 16 is provided; however, the arrangement of two guide stays on opposite sides of the guide slot 15 is possible also.

As shown in FIG. 14, the guide stay 16 has a width e. The width e corresponds approximately to the width f of the guide groove 17 shown in FIG. 19. The widths e and f advantageously are approximately one fourth to approximately two thirds of the thickness g of the flyweights 5, respectively. In this way, an excellent guiding action in axial direction is provided. As shown in the detail illustrations of the holder 3 in FIGS. 15 to 19, the guide grooves 17 are each provided on the same side of the guide socket 4 of the holder 3 so that a configuration of the holder 3 with rotational symmetry results. As illustrated in FIG. 16, the holder 3 has a receptacle 7 for the drive shaft 8.

Advantageously, the flyweights 5 as well as the holders 3 and the clutch drum 2 are made of metal. The flyweights 5 are advantageously produced by a sintering process wherein the securing noses 12, 13, and 14 are sintered onto the flyweights 5 as monolithic parts thereof. Additional component for axial securing of the flyweights 5 or the springs 6 are no longer needed because of the securing noses 12, 13, and 14.

The specification incorporates by reference the entire disclosure of German priority document 10 2010 008 244.9 having a filing date of Feb. 17, 2010.

While specific embodiments of the invention have been shown and described in detail to illustrate the inventive principles, it will be understood that the invention may be embodied otherwise without departing from such principles.

What is claimed is:

1. A coupling device actuated by centrifugal force, the coupling device comprising:
a holder;
at least one flyweight supported on said holder so as to be moveable in a radial direction relative to an axis of rotation about which the coupling device is rotatable, wherein said at least one flyweight is movable between an inner radial position and an outer radial position;
at least one spring acting on said at least one flyweight so as to force said at least one flyweight into said inner radial position;
at least one securing element securing said at least one spring in an axial direction of said axis of rotation;
wherein said at least one securing element is monolithically formed on said at least one flyweight;
wherein said at least one securing element secures said at least one spring, when said at least one spring breaks, on the centrifugal clutch and prevents lateral deflection of said at least one spring in said axial direction;
wherein said at least one flyweight has a receptacle and wherein said at least one spring is arranged about at least a portion of a length thereof in said receptacle;
wherein said receptacle has a first one of said at least one securing element arranged on a radially inwardly positioned side of said receptacle and a second one of said at least one securing element arranged on a radially outwardly positioned side of said receptacle for securing said at least one spring.

2. The coupling device according to claim 1, wherein a spacing between said first and second securing elements is smaller than an outer diameter of said at least one spring.

3. A coupling device actuated by centrifugal force, the coupling device comprising:
a holder;
at least one flyweight supported on said holder so as to be moveable in a radial direction relative to an axis of rotation about which the coupling device is rotatable, wherein said at least one flyweight is movable between an inner radial position and an outer radial position;
at least one spring acting on said at least one flyweight so as to force said at least one flyweight into said inner radial position;
at least one securing nose that is arranged adjacent to a circumference of at least one winding of said at least one spring and is approximately wedge-shaped, wherein said at least one securing nose secures said at least one spring in an axial direction of said axis of rotation;
wherein said at least one securing nose is monolithically formed on said at least one flyweight;
wherein said at least one securing nose secures said at least one spring, when said at least one spring breaks, on the centrifugal clutch and prevents lateral deflection of said at least one spring in said axial direction;
wherein said at least one flyweight has a receptacle and wherein said at least one spring is arranged about at least a portion of a length thereof in said receptacle, wherein said receptacle has a first sidewall and a second sidewall opposite said first sidewall, and wherein said at least one securing nose is connected to said first sidewall and projects into said receptacle toward said second sidewall, wherein said at least one securing nose is spaced at a distance from said second sidewall.

4. The coupling device according to claim 3, wherein, in the axial direction of said axis of rotation, said receptacle has a first axial end and a second axial end opposite said first axial end, wherein said first and second axial ends are open, wherein said at least one securing nose is located at said first axial end.

5. The coupling device according to claim 3, wherein said first and second sidewalls have a first area and are spaced at a first spacing relative to each other in said first area, wherein said first spacing is greater than an outer diameter of said at least one spring, wherein said first and second sidewalls have a second area and are spaced at a second spacing relative to each other in said second area, wherein in said second area said at least one securing nose is disposed, and wherein said second spacing is measured parallel to said first spacing and is smaller than said outer diameter of said at least one spring.

6. The coupling device according to claim 3, wherein said at least one securing nose and said at least one spring extend into a section plane of the coupling device, said section plane being perpendicular to said axis of rotation.

7. The coupling device according to claim 3, wherein, in an axial direction of said axis of rotation, said receptacle has a first open axial end and a second open axial end opposite said first open axial end, wherein said first and second open axial ends are open at least across an entire width of said at least one spring, and wherein said at least one securing nose is a projection that covers at least partially one of said first and second open axial ends.

8. A coupling device actuated by centrifugal force, the coupling device comprising:
   a holder;
   at least one flyweight supported on said holder so as to be moveable in a radial direction relative to an axis of rotation about which the coupling device is rotatable, wherein said at least one flyweight is movable between an inner radial position and an outer radial position;
   at least one spring acting on said at least one flyweight so as to force said at least one flyweight into said inner radial position;
   at least one securing element securing said at least one spring in an axial direction of said axis of rotation;
   wherein said at least one securing element is monolithically formed on said at least one flyweight;
   wherein said at least one securing element secures said at least one spring, when said at least one spring breaks, on the centrifugal clutch and prevents lateral deflection of said at least one spring in said axial direction;
   wherein two of said at least one flyweights are positioned adjacent to each other and wherein said at least one spring is a coil tension spring having a first end and a second end, wherein said first end is suspended from a first one of said two flyweights and wherein said second end is suspended from a second one of said two flyweights;
   wherein between said two flyweights an intermediate space is provided that is bridged by said coil tension spring;
   a radial securing element that is monolithically formed with one of said two flyweights and is positioned at a radially outwardly positioned side of said said at least one coil tension spring and projects adjacent to said coil tension spring into said intermediate space;
   wherein said two flyweights each have one of said radial securing element and said radial securing elements point toward one another, wherein a spacing between said radial securing elements in a rest position of the coupling device is approximately 0.5 times to approximately 2 times a wire diameter of said coil tension spring.

9. A coupling device actuated by centrifugal force, the coupling device comprising:
   a holder;
   at least one flyweight supported on said holder so as to be moveable in a radial direction relative to an axis of rotation about which the coupling device is rotatable, wherein said at least one flyweight is movable between an inner radial position and an outer radial position;
   at least one spring acting on said at least one flyweight so as to force said at least one flyweight into said inner radial position;
   at least one securing element securing said at least one spring in an axial direction of said axis of rotation;
   wherein said at least one securing element is monolithically formed on said at least one flyweight;
   wherein said at least one securing element secures said at least one spring, when said at least one spring breaks, on the centrifugal clutch and prevents lateral deflection of said at least one spring in said axial direction;
   wherein an outer diameter of said at least one spring matches at least a thickness of said at least one flyweight and the at least one flyweight does not project in said axial direction of said axis of rotation past said at least one spring.

10. The coupling device according to claim 9, wherein said at least one flyweight is comprised of metal.

11. The coupling device according to claim 9, wherein said at least one securing element is sintered onto said at least one flyweight.

12. The coupling device according to claim 9, wherein three of said at least one flyweight and three of said at least one spring are provided, wherein said three flyweights are connected to each other by said three springs.

13. The coupling device according to claim 9, wherein the coupling device is a centrifugal clutch with a clutch drum, wherein said at least one flyweight in said outer radial position rests against said clutch drum.

14. A coupling device actuated by centrifugal force, the coupling device comprising:
   a holder;
   at least one flyweight supported on said holder so as to be moveable in a radial direction relative to an axis of rotation about which the coupling device is rotatable, wherein said at least one flyweight is movable between an inner radial position and an outer radial position;
   at least one spring acting on said at least one flyweight so as to force said at least one flyweight into said inner radial position;
   at least one securing element securing at least one component of the coupling device in an axial direction of said axis of rotation;
   wherein said at least one securing element is monolithically formed on said at least one flyweight;
   wherein said at least one component secured by said at least one securing element in said axial direction is said at least one flyweight secured by said at least one securing element on said holder in said axial direction;
   wherein said at least one securing element is formed on said at least one flyweight as a guide stay and wherein said holder has a guide groove, wherein said guide stay projects into said guide groove;
   wherein said at least one flyweight has an approximately radially oriented guide slot and wherein said holder has a guide socket, wherein said guide socket projects into said guide slot;
   wherein said guide groove is formed in said guide socket of said holder and wherein said guide stay formed on said at least one flyweight projects into said guide slot of said flyweight.

15. The coupling device according to claim 14, wherein said guide stay projects centrally into said guide groove.

16. The coupling device according to claim 14, wherein said guide stay has opposed sides that are engaged by said guide socket.

* * * * *